United States Patent
Block et al.

(10) Patent No.: US 11,022,238 B2
(45) Date of Patent: Jun. 1, 2021

(54) LIGHTWEIGHT HOSE

(71) Applicant: Fiskars Finland Oy Ab, Helsinki (FI)

(72) Inventors: Andrew P. Block, Madison, WI (US); Steve Stokes, Fitchburg, WI (US)

(73) Assignee: Fiskars Finland Oy Ab, Helsinki (FI)

( * ) Notice: Subject to any disclaimer, the term of this patent is extended or adjusted under 35 U.S.C. 154(b) by 132 days.

(21) Appl. No.: 16/394,603

(22) Filed: Apr. 25, 2019

(65) Prior Publication Data

US 2019/0331261 A1    Oct. 31, 2019

Related U.S. Application Data

(60) Provisional application No. 62/663,634, filed on Apr. 27, 2018.

(51) Int. Cl.
| | |
|---|---|
| *F16L 11/08* | (2006.01) |
| *B29C 48/10* | (2019.01) |
| *B29C 48/18* | (2019.01) |
| *F16L 33/01* | (2006.01) |
| *B29L 23/00* | (2006.01) |
| *B32B 1/08* | (2006.01) |

(52) U.S. Cl.
CPC ............ *F16L 11/081* (2013.01); *B29C 48/10* (2019.02); *B29C 48/18* (2019.02); *F16L 33/01* (2013.01); *B29L 2023/005* (2013.01); *B32B 1/08* (2013.01)

(58) Field of Classification Search
CPC .......... F16L 11/12; F16L 11/00; F16L 11/112; F16L 11/08; F16L 11/088; F16L 11/085
USPC ................. 138/123–126, 173, 118, 119, 109
See application file for complete search history.

(56) References Cited

U.S. PATENT DOCUMENTS

| | | | |
|---|---|---|---|
| 3,581,778 A | 6/1971 | Korejwa et al. | |
| 4,467,837 A * | 8/1984 | Baker | F16L 11/12 138/119 |
| 4,478,661 A * | 10/1984 | Lewis | F16L 11/10 138/128 |

(Continued)

FOREIGN PATENT DOCUMENTS

| | | | |
|---|---|---|---|
| WO | WO-2007/144858 A2 | 12/2007 | |
| WO | WO-2013/071449 A1 | 5/2013 | |

OTHER PUBLICATIONS

International Search Report and Written Opinion regarding International Application No. PCT/IB2019/053429, dated Jul. 9, 2019, 13 pages.

*Primary Examiner* — Patrick F Brinson
(74) *Attorney, Agent, or Firm* — Foley & Lardner LLP (57) ABSTRACT

Systems and apparatuses include a tubular body of a garden hose assembly. The tubular body includes an inner tube including an inner surface and an outer surface, wherein the inner surface defines an interior passageway of the garden hose assembly. The tubular body further includes an outer tube including an inner surface and an outer surface, wherein the inner surface surrounds the outer surface of the inner tube. The tubular body further includes a reinforcement layer including a helical pattern spiraling in at least one direction around the outer surface of the outer tube. The tubular body further includes an inner cover including an inner surface and an outer surface, wherein the inner surface surrounds the reinforcement layer. The tubular body further includes an outer cover including an inner surface and an outer surface, wherein the inner surface surrounds the outer surface of the inner cover.

18 Claims, 6 Drawing Sheets

(56) References Cited

U.S. PATENT DOCUMENTS

| | | | |
|---|---|---|---|
| 4,487,444 A | 12/1984 | Hensen | |
| 6,193,282 B1 * | 2/2001 | Assenheimer | F16L 11/00 |
| | | | 285/115 |
| 6,955,189 B1 * | 10/2005 | Weyker | F16L 55/00 |
| | | | 138/104 |
| 7,546,852 B1 | 6/2009 | Fails et al. | |
| 8,752,591 B2 * | 6/2014 | Montalvo | F16L 11/112 |
| | | | 138/122 |
| 9,920,861 B2 * | 3/2018 | Gorilovskiy | B32B 5/028 |
| 2002/0100516 A1 | 8/2002 | Powell et al. | |
| 2007/0131298 A1 * | 6/2007 | Ueng | F16L 11/22 |
| | | | 138/115 |
| 2010/0126986 A1 * | 5/2010 | Gunzing | F16L 11/085 |
| | | | 219/643 |
| 2012/0234424 A1 * | 9/2012 | Bernhardt | F16L 33/223 |
| | | | 138/137 |
| 2016/0033060 A1 * | 2/2016 | Bunting | B29C 48/22 |
| | | | 138/125 |
| 2019/0145553 A1 * | 5/2019 | Mezzalira | F16L 11/08 |
| | | | 138/118 |

* cited by examiner

LIGHTWEIGHT HOSE

CROSS REFERENCE TO RELATED APPLICATIONS

The present invention claims the benefit of U.S. Provisional Patent Application No. 62/663,634 filed on Apr. 27, 2018, the entire contents of which are incorporated by reference herein.

BACKGROUND

The present invention relates generally to an apparatus, system, and method for providing a hose for a user, and in particular to a lightweight and flexible hose including multiple reinforced layers.

Garden hoses are typically tubular bodies designed to resist bursting, leaking, and kinking during use. Garden hoses can fall into two categories. The first category includes cylindrical elastomeric hoses with internal reinforcements. The garden hoses of this type include dense compounds such as rubber, rubber-vinyl, polyvinyl chloride, or polyurethane materials. These garden hoses have a wall thickness sufficient to provide kink resistance when the garden hose is bent without any pressurized fluid flowing therethrough, and require a large amount of space to store. In some cases, hoses of this type require specialized storage devices, such as a hose reel, to improve the ease of storage. Additionally, the thick walls and the dense compounds create sufficient weight such that the garden hose becomes heavy to carry and stiff, such that the garden hoses are hard to maneuver.

The second category includes thinner, more flexible inner tubes surrounded by a tubular fabric jacket, providing reinforcement to inhibit expansion of the inner tube beyond an acceptable dimension. The reinforcement layer is a woven mesh of fibers that may retain water, dirt, and allow passage of mulch fibers or abrasive particles into the space between the inner tube and the fabric jacket, which may cause the hose to increase substantially in weight, cause punctures of the inner tube, and cause weakening of the inner tube due to abrasion between the fabric cover and the inner tube. Improving the strength and durability of the fabric cover layers increases the weight of the garden hose and further increases the amount of fabric that may retain water weight when wet.

The present disclosure seeks to overcome certain of these limitations and other drawbacks of existing devices, systems, and methods, and to provide new features.

SUMMARY

In some embodiments, a garden hose assembly includes an inner tube including an inner tube inner surface and an inner tube outer surface. The inner tube inner surface defines an interior passageway of the garden hose assembly. An outer tube includes an outer tube inner surface and an outer tube outer surface, and the inner surface surrounds the inner tube outer surface. A reinforcement layer including a helical pattern spirals in at least one direction around the outer tube outer surface. An inner cover includes an inner cover inner surface and an inner cover outer surface, and the inner cover inner surface surrounds the reinforcement layer. An outer cover includes an outer cover inner surface and an outer cover outer surface, and the outer cover inner surface of the outer cover surrounds the inner cover outer surface. At least one of the inner tube, the outer tube, the inner cover, or the outer cover comprise a base thermoplastic material, and the base thermoplastic material of one or more of the outer tube or the outer cover comprises at least one additive.

In some embodiments, a garden hose assembly includes a tubular body including a tube defining an interior passageway of the garden hose assembly and comprising a base thermoplastic material, a reinforcement surrounding the tube, and a cover surrounding the reinforcement comprising the base thermoplastic material and at least one cover additive. The tubular body has a substantially flattened shape.

In some embodiments, a method includes extruding a tube including a base thermoplastic material, applying a reinforcement to the tube, extruding a cover over the tube and reinforcement, the cover comprising the base thermoplastic material and at least one cover additive, and flattening the cover, reinforcement, and tube after extruding the cover and before the cover has cooled.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the drawings, a lightweight and flattened garden hose assembly allows a user to cleanly coil and compactly store the garden hose assembly and includes an inner tube, and outer tube, an inner reinforcement, an outer reinforcement, an inner cover, and an outer cover. Ends of the garden hose assembly can accept couplings allowing the user to connect the hose assembly between a water source and an implement.

Figure 1:
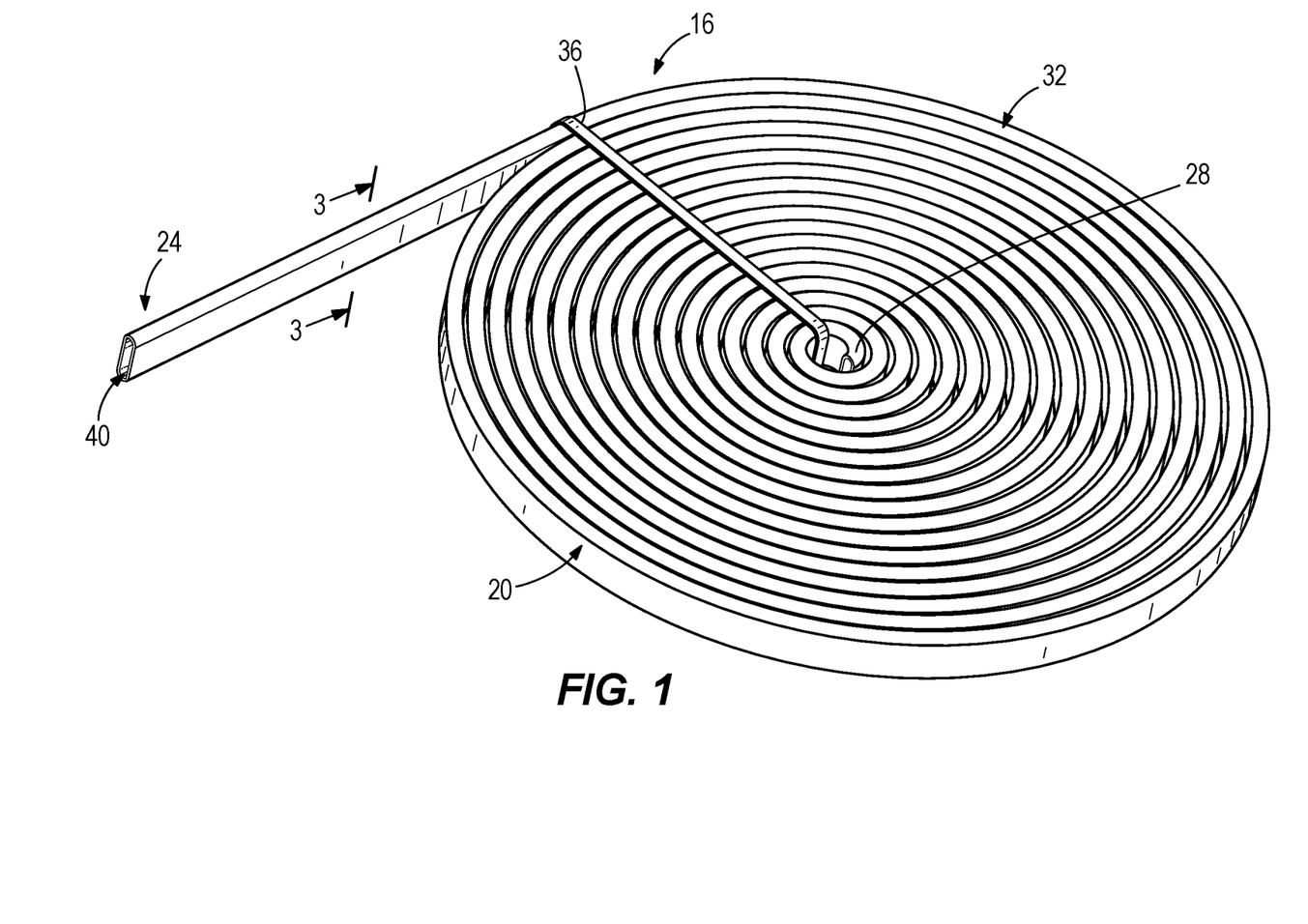
FIG. 1 is a perspective view of one embodiment of a garden hose assembly.

As shown in FIG. 1, a garden hose assembly 16 has a generally flattened hollow tubular body 20 and includes a first end 24 and a second end 28. The first end 24 and the second end 28 may be connected to any standard coupling for engagement with a fluid inlet or outlet. The garden hose assembly 16 is shown in a rolled state, wherein the tubular body 20 forms a coil 32. In the embodiment shown, the coil 32 of the garden hose assembly 10 is maintained by a tie 36. The garden hose assembly 16 includes a central opening 40, which extends from the first end 24 to the second end 28 and forms a passage for fluid to flow therethrough.

Figure 2:
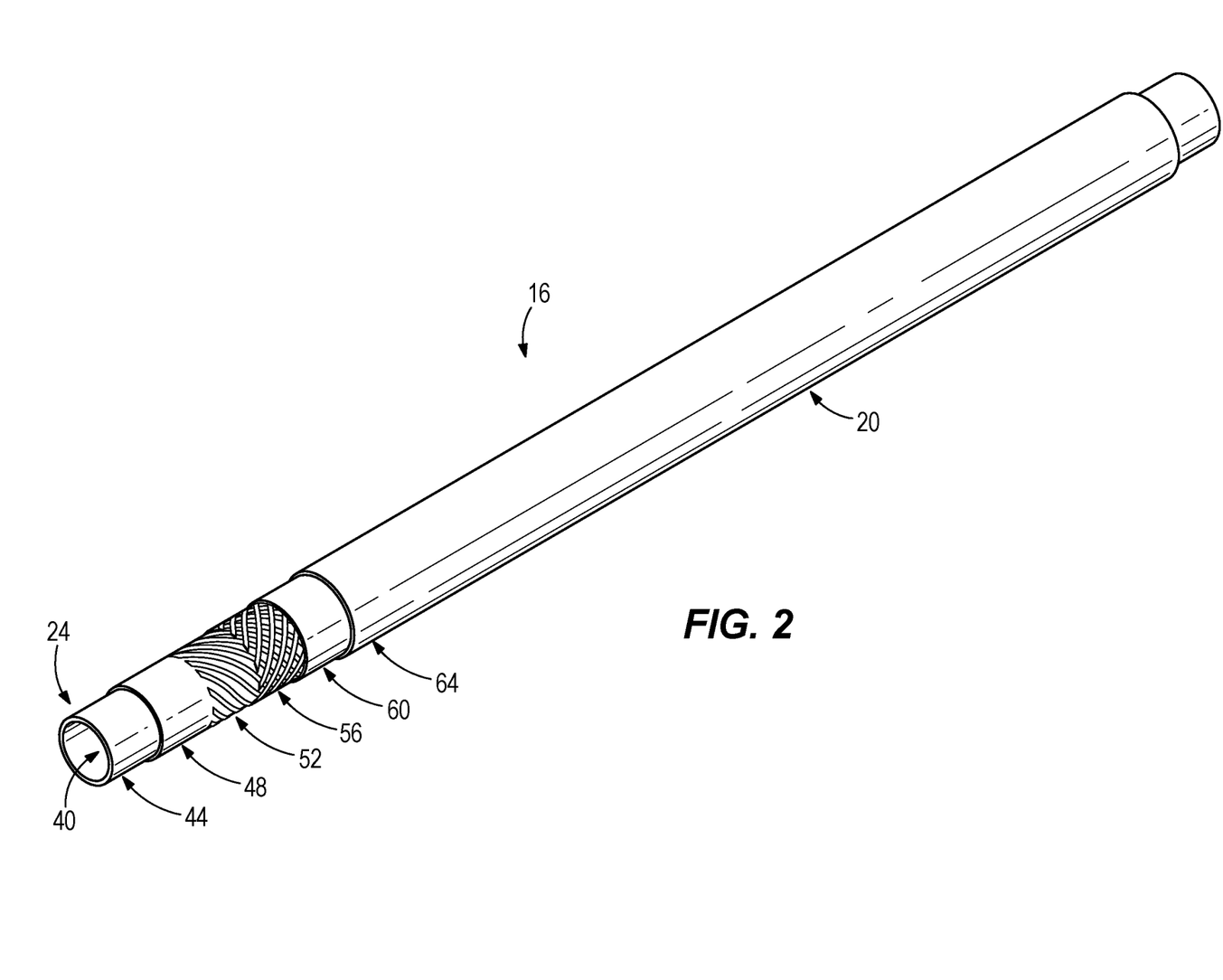
FIG. 2 is a partially exploded perspective view of one end of the garden hose assembly of FIG. 1.

As shown in FIG. 2, the tubular body 20 of the garden hose assembly 16 includes an inner tube 44 that is hollow and forms the central opening 40, an outer tube 48 that surrounds the inner tube 44, an inner reinforcement 52 that surrounds the outer tube 48, an outer reinforcement 56 that surrounds the inner reinforcement 52, an inner cover 60 that surrounds the outer reinforcement 56, and an outer cover 64 that surrounds the inner cover 60.

The inner tube 44 forms the opening 40 of the garden hose assembly 16. In some embodiments, the inner tube 44 is constructed from a base thermoplastic material such as styrene ethylene butylene styrene (SEBS). In some embodiments, the SEBS is blended with polypropylene to achieve the desired stiffness and material properties. For example, the inner tube may define a Shore A hardness of sixty-four (64). In some embodiments, the Shore A hardness may be between about seventy (70) and about ninety (90). In some embodiments, the base thermoplastic material includes TPV, TPU, or other thermoplastics. In some embodiments, the thermoplastic material has a stress at 100% elongation between 350 and 450 psi. In some embodiments, the thermoplastic material has a stress at 100% elongation of about 399 psi. In some embodiments, the thermoplastic material has a stress at 300% elongation between 450 and 550 psi. In some embodiments, the thermoplastic material has a stress at 300% elongation of about 480 psi. In some embodiments, the thermoplastic material is extensible beyond 400% its formed length without tensile yield. In some embodiments, the thermoplastic material breaks at a 500% elongation. In some embodiments, the thermoplastic material has a density between 0.5 and 1.5 g/cm$^3$. In some embodiments, the thermoplastic material has a density between 0.8 and 1.0 g/cm$^3$. In some embodiments, the inner tube 44 is free of additional additives to the base thermoplastic material.

As will be described further below, some layers of the tubular body 20 are formed from the base thermoplastic material, and some layers are formed from a combination of the base thermoplastic material and additives that alter the physical properties of the base thermoplastic material. In addition, the base thermoplastic material or the additives can include recycled material. For example, the inner tube 44 may be as thin as possible to impart minimal impurities to drinking water (relatively few or no additives or recycled material). However, outer tube layers, covers, or other layers may be thicker and contain all recycled material or a non-zero percentage of recycled material. In some embodiments, an outer layer or cover may be thin and contain UV resistant additives. Details of exemplary layers will be discussed in more detail below.

The outer tube 48 surrounds the inner tube 44. In some embodiments, the inner tube 44 and the outer tube 48 are co-extruded and cooled together. In some embodiments, after co-extrusion, the inner tube 44 and the outer layer 48 are rolled flat prior to cooling. In some embodiments, the outer tube 48 is constructed from a base thermoplastic material such as styrene ethylene butylene styrene (SEBS). In some embodiments, the SEBS is blended with polypropylene to achieve the desired stiffness and material properties. In some embodiments, the thermoplastic material has a stress at 100% elongation between 350 and 450 psi. In some embodiments, the thermoplastic material has a stress at 100% elongation of about 399 psi. In some embodiments, the thermoplastic material has a stress at 300% elongation between 450 and 550 psi. In some embodiments, the thermoplastic material has a stress at 300% elongation of about 480 psi. In some embodiments, the thermoplastic material is extensible beyond 400% its formed length without tensile yield. In some embodiments, the thermoplastic material breaks at a 500% elongation. In some embodiments, the thermoplastic material has a density between 0.5 and 1.5 g/cm$^3$. In some embodiments, the thermoplastic material has a density between 0.8 and 1.0 g/cm3. In some embodiments, the outer tube 48 comprises at least one additive to provide aesthetic colorant and reduce tackiness for processing of the outer tube 48. In some embodiments, the additive is a colorant such as opaque black. In some embodiments, the outer tube 48 is sufficiently bonded to the inner tube 44, such that no movement occurs between the inner tube 44 and the outer tube 44.

The inner reinforcement 52 surrounds the outer tube 48. In some embodiments, the inner reinforcement 52 is constructed from at least one yarn such as polyester yarn. In some embodiments, the yarn includes a one-thousand (1000) denier twisted strand yarn. The inner reinforcement 52 is comprised of a helical pattern that extends in a clockwise direction around the outer tube 48. In other embodiments, the inner reinforcement 52 is comprised of a different pattern such as a solid pattern, a bi-directional helical pattern, or a woven pattern. The inner reinforcement 52 is configured to inhibit expansion and elongation of the of the garden hose assembly 16 while retaining flexibility.

The outer reinforcement 56 surrounds the inner reinforcement 52. In some embodiments, the outer reinforcement 56 is constructed from at least one yarn such as polyester yarn. In some embodiments, the inner reinforcement 52 and the outer reinforcement 56 are constructed of different materials. The outer reinforcement 56 is comprised of a helical pattern that extends in a counter-clockwise direction around the inner reinforcement 52. In some embodiments, the outer reinforcement 56 is comprised of an equal strength yarn as the inner reinforcement 52. In some embodiments, the outer reinforcement 56 extends in the same direction as the inner reinforcement 52, such that both the inner reinforcement 52 and the outer reinforcement surround the outer tube 48 in a clockwise or a counter-clockwise direction. The inner and outer 52, 56 reinforcements form a flexible support to inhibit significant expansion or elongation of the tubular body 20 of the garden hose assembly 16 while still retaining flexibility.

The inner cover 60 surrounds the outer reinforcement 56. In some embodiments, the inner cover 60 is constructed from a base thermoplastic material such as styrene ethylene butylene styrene (SEBS). In some embodiments, the SEBS is blended with polypropylene to achieve the desired stiffness and material properties. In some embodiments, the thermoplastic material has a stress at 100% elongation between 350 and 450 psi. In some embodiments, the thermoplastic material has a stress at 100% elongation of about 399 psi. In some embodiments, the thermoplastic material has a stress at 300% elongation between 450 and 550 psi. In some embodiments, the thermoplastic material has a stress at 300% elongation of about 480 psi. In some embodiments, the thermoplastic material is extensible beyond 400% its formed length without tensile yield. In some embodiments, the thermoplastic material breaks at a 500% elongation. In some embodiments, the thermoplastic material has a density between 0.5 and 1.5 g/cm$^3$. In some embodiments, the thermoplastic material has a density between 0.8 and 1.0 g/cm3. In some embodiments, the inner cover 60 comprises at least one additive to provide aesthetic colorant. In some embodiments, the additive is a colorant such as translucent black. In some embodiments, the inner cover 60 is sufficiently bonded to the outer tube 48, such that the inner and outer reinforcements 52, 56 retain their relative positions around the outer tube 48.

The outer cover 64 surrounds the inner cover 60. In some embodiments, the outer cover 64 is constructed from a base thermoplastic material such as styrene ethylene butylene styrene (SEBS). In some embodiments, the SEBS is blended with polypropylene to achieve the desired stiffness and material properties. In some embodiments, the thermoplastic material has a stress at 100% elongation between 350 and 450 psi. In some embodiments, the thermoplastic material has a stress at 100% elongation of about 399 psi. In some embodiments, the thermoplastic material has a stress at 300% elongation between 450 and 550 psi. In some embodiments, the thermoplastic material has a stress at 300% elongation of about 480 psi. In some embodiments, the thermoplastic material is extensible beyond 400% its formed length without tensile yield. In some embodiments, the thermoplastic material breaks at a 500% elongation. In some embodiments, the thermoplastic material has a density between 0.5 and 1.5 g/cm$^3$. In some embodiments, the thermoplastic material has a density between 0.8 and 1.0 g/cm3. In some embodiments, the outer cover 64 comprises at least one additive to provide resistance to the garden hose assembly 16 against environmental conditions such as UV rays or biological attack. In some embodiments, the additive is a UV modifier. In some embodiments, the outer cover 64 is sufficiently bonded to the inner cover 60, such that no movement occurs between the inner cover 60 and the outer cover 64. In some embodiments, the outer cover 64 comprises a striped pattern 66 of the same base thermoplastic material of the outer cover 64 comprising at least one additive to provide aesthetic colorant (see FIG. 4). The striped pattern 66 may run longitudinally from the first end 24 to the second end 28 of the garden hose assembly. For example, in some embodiments a single additive is used to provide both UV resistance and tint or color. In some embodiments, the single additive is used only in the outer cover 64.

The inner and outer covers 60, 64 form a protective barrier around the inner and outer reinforcements 52, 56 to protect the inner and outer reinforcements 52, 56 from external elements that may damage the garden hose assembly 16, such as UV degradation, biological attack, dirt, and debris. Additionally, the inner and outer reinforcements 52, 56 are unable to absorb and retain water, thereby preventing the garden hose assembly 16 from increasing in weight. In some embodiments, the inner and outer covers 60, 64 may also increase the puncture resistance of the garden hose assembly 16.

In some embodiments, the plurality of layers 44-64 extend the entire length of the tubular body 20, from the first end 24 to the second end 28 of the garden hose assembly 16. In other embodiments, the layers 44-64 may start and end at various locations along the tubular body 20 of the garden hose assembly 16. For example, the inner and outer reinforcement layers 52, 56 may extend only over a central portion of the tubular body 20 and may be absent at the first end 24 and the second end 28 of the garden hose assembly 16. Such an embodiment would allow improved flexibility of the garden hose assembly 16 at the first end 24 and the second end 28.

In some embodiments, the inner and outer tubes 44, 48 and the inner and outer covers 60, 64 are constructed of the same thermoplastic base material. In other embodiments, the inner and outer tubes 44, 48 and the inner and outer covers 60, 64 include different thermoplastic base materials.

Figure 3:
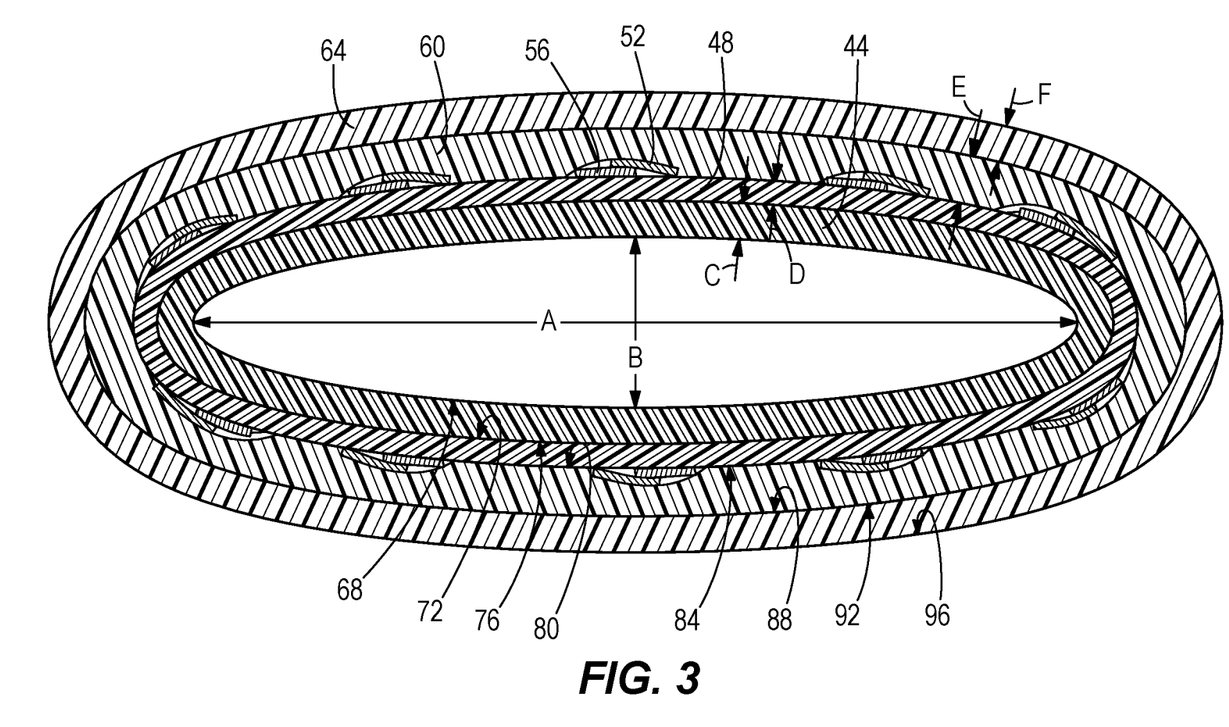
FIG. 3 is a sectional view of the garden hose assembly of FIG. 1 taken along line 3-3 in FIG. 2.

As shown in FIG. 3, the garden hose assembly 16 has a generally flattened shape. In some embodiments, the garden hose assembly 16 remains in the generally flattened shape in absence of internal pressure. A width A of the opening 40 of the garden hose assembly 16 is about 0.70 inches. In some embodiments, the width A of the opening 40 is between about 0.50 and about 1.0 inches. A height B of the opening 40 of the garden hose assembly 16 is about 0.25 inches. In some embodiments, the height B of the opening 40 is between about 0.075 and about 0.150 inches. In some embodiments, when pressurized, the garden hose assembly 16 forms a substantially circular tube with a round cross section. Upon expansion of the garden hose assembly 16, the opening 40 has a width A about 0.50 inches. In some embodiments, the opening 40 in the expanded state may have a width A between about 0.25 and about 0.75 inches. Upon expansion of the garden hose assembly 16, the opening 40 has a height B about 0.50 inches. In some embodiments, the opening 40 in the expanded state may have a height B between about 0.25 and about 0.75 inches.

In the embodiment shown in FIG. 2, the first end 24 and the second end 28 of the garden hose assembly 16 include a tubular body 20 that is circular in shape. The ends 24, 28 of the garden hose assembly 16 have a circular shape such that the ends 24, 28 may fit to a standard coupling for engagement with a fluid inlet or outlet. In the embodiment shown in FIG. 4, the cross section of the garden hose assembly 16 includes a tubular body 20 that has a flattened shape. In other embodiments, one or more of the ends 24, 28 may include the flattened shape of the tubular body 20 and may be configured to fit a coupling specifically for a flattened shape.

The inner tube 44 includes an inner surface 68 and an outer surface 72. A thickness C of the inner tube 44 extending from the inner surface 68 to the outer surface 72 is about 0.025 inches. In some embodiments, the thickness C of the inner tube 44 is between about 0.015 and about 0.035 inches.

The outer tube 48 includes an inner surface 76 and an outer surface 80. A thickness D of the outer tube 48 extending from the inner surface 76 to the outer surface 72 is about 0.020 inches. In some embodiments, the thickness D of the outer tube 48 is between about 0.010 and about 0.030 inches. In some embodiments, the inner surface 76 of the outer tube 48 is bonded to the outer surface 72 of the inner tube 44, such as to prevent movement between the inner tube 44 relative to the outer tube 48.

As the outer tube 48 may contain additives, which increase the overall weight of the outer tube 48, the outer tube 48 may have a smaller thickness D than the thickness C of the inner tube 44, which is free of additives. A thicker inner tube 44 relative to the outer tube 48 provides for a more lightweight garden hose assembly 16. In some embodiments, a ratio of the thickness C of the inner tube 44 to the thickness D of the outer tube 48 is between about 3:2 and 7:6. In some embodiments, the ratio of the thickness C of the inner tube 44 to the thickness D of the outer tube 48 is about 5:4.

The inner cover 60 includes an inner surface 84 and an outer surface 88. A thickness E of the inner cover 60 extending from the inner surface 84 to the outer surface 88 is about 0.025 inches. In some embodiments, the thickness E of the inner cover 60 is between about 0.015 and about 0.035 inches. In some embodiments, the inner surface 84 of the inner cover 60 is bonded to the outer surface 80 of the outer tube 48, such that the inner and outer reinforcements 52, 56 retain their relative positions around the outer tube 48. In some embodiments, the inner cover 60 has a thickness E that is substantially thick so as to provide protection to the inner and outer reinforcement layers 52, 56 from external elements.

The outer cover 64 includes an inner surface 92 and an outer surface 96. A thickness F of the outer cover 64 extending from the inner surface 92 to the outer surface 96 is about 0.015 inches. In some embodiments, the thickness F of the outer cover 64 is between about 0.010 and about 0.030 inches. In some embodiments, the inner surface 92 of the outer cover 64 is bonded to the outer surface 88 of the inner cover 60, such as to prevent movement between the inner cover 60 relative to the outer cover 64.

As the outer cover 64 may contain additives, which increase the overall weight of the outer cover 64, the outer cover 64 may have a smaller thickness F than the thickness E of the inner cover 60. A thicker inner cover 60 relative to the outer cover 64 provides for a more lightweight garden hose assembly 16. In some embodiments, a ratio of the thickness E of the inner cover 60 to the thickness F of the outer cover 64 is between about 3:2 and 7:6. In some embodiments, the ratio of the thickness E of the inner cover 60 to the thickness F of the outer cover 64 is about 5:4.

In some embodiments, in the absence of internal pressure, the outer surface 96 of the outer cover 64 forms a substantially parallel offset from the inner surface 68 of the inner tube 44 that is approximately equivalent to the sum of the thickness C of the inner tube 44, the thickness D of the outer tube 48, the thickness E of the inner cover 60, and the thickness F of the outer cover 64, such that the height B of the opening 40 approaches zero.

Figure 4:
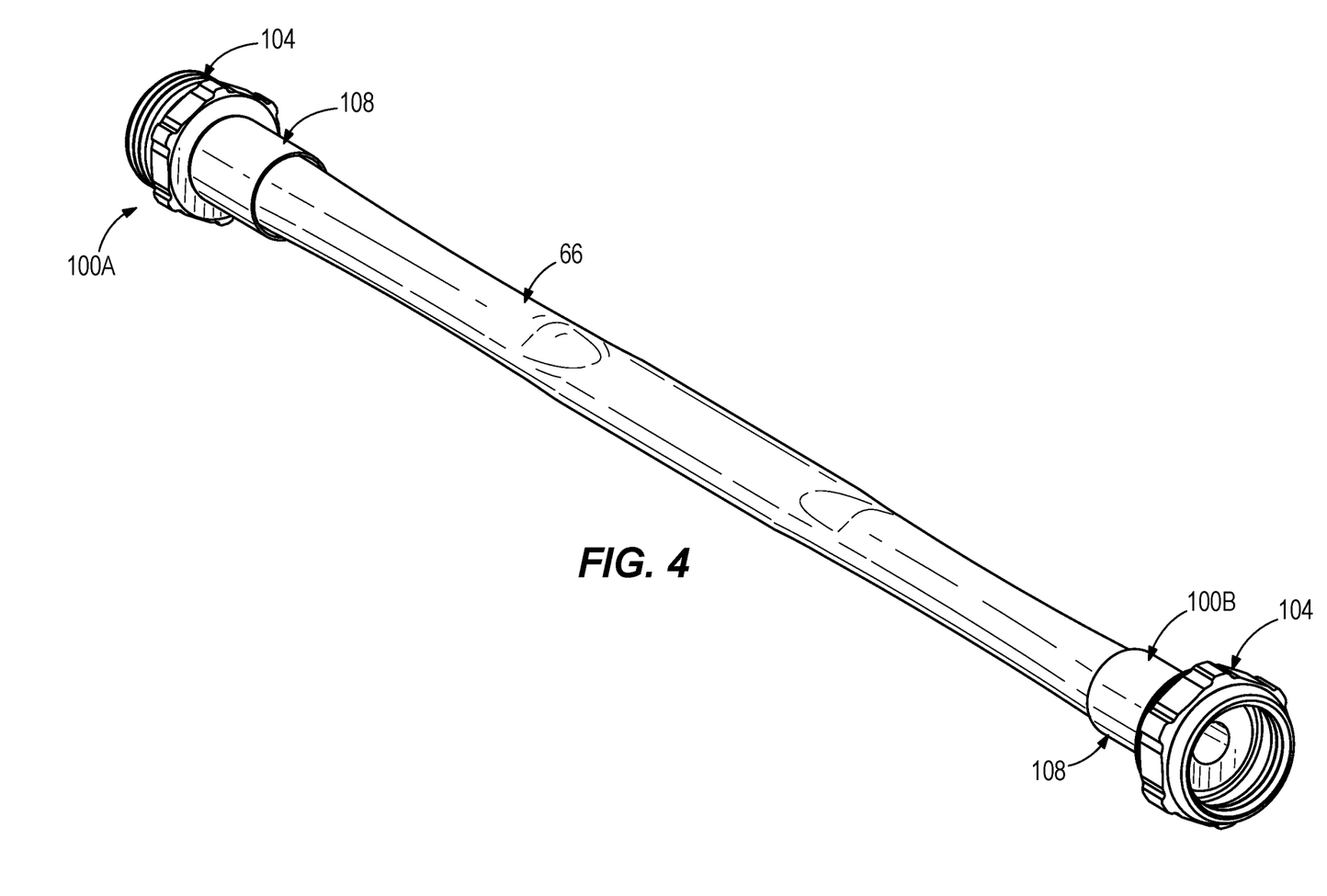
FIG. 4 is a perspective view of the garden hose assembly of FIG. 1 coupled to a first fitting and a second fitting.

As shown in FIG. 4, the garden hose assembly 16 can include a first fitting in the form of a male fitting 100A and a second fitting in the form of a female fitting 100B. The fittings 100A, 100B each include a coupling 104 and a ferrule 108.

Figure 5:
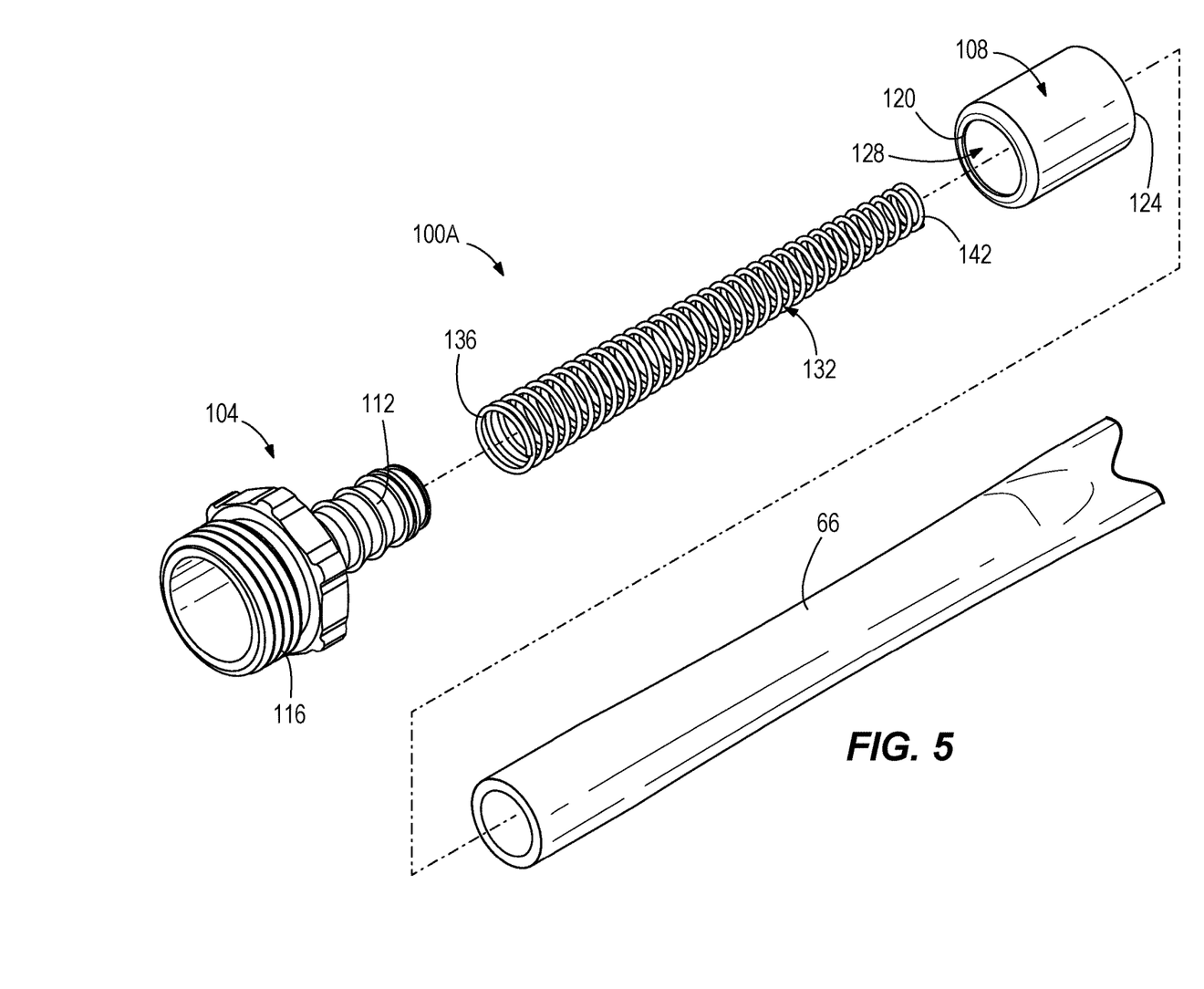
FIG. 5 is an exploded view of the first fitting of FIG. 4.
Figure 6:
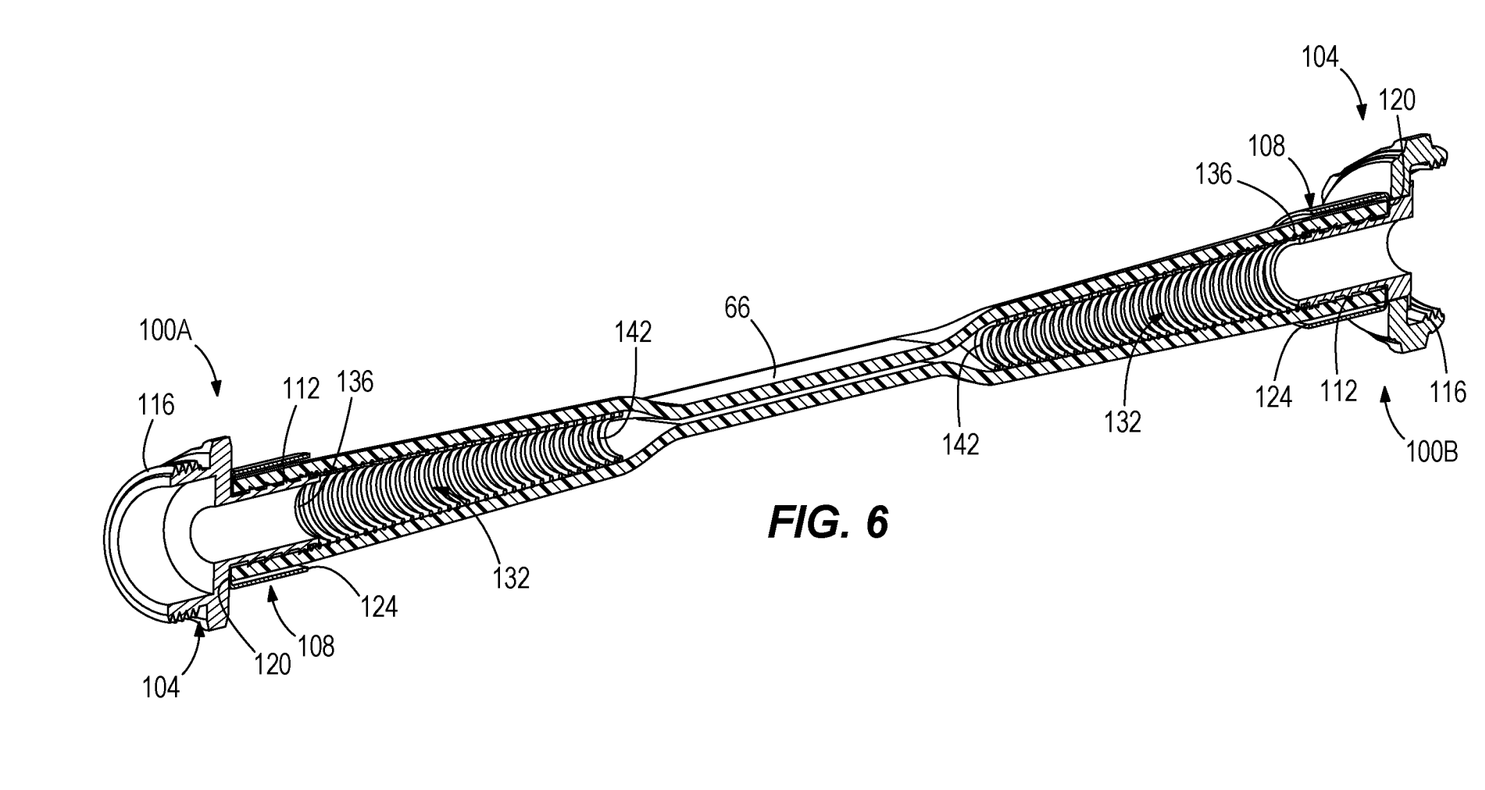
FIG. 6 is a sectional view of the garden hose assembly of FIG. 4 taken along line 6-6 of FIG. 4.

As shown in FIG. 5, the coupling 104 includes a shank 112 and a threaded portion 116. In some embodiments, the shank 112 includes a barbed section sized to engage an interior of the tubular body 20 and allow fluid flow therethrough. The shank 112 may also include a reinforcement retaining feature in the form of a groove, slot, aperture, recess, or other structural feature. The threaded portion 116 may include a male garden hose thread in the case of the fitting 100A or a female garden hose thread in the case of the fitting 100B. The threaded portion 116 may also include grip features, quick disconnects, or other garden hose connection features.

The ferrule 108 generally includes a first ferrule end 120 and a second ferrule end 124, with a central hole 128 connecting the first ferrule end 120 to the second ferrule end 124. The shank 112 of the coupling 104 is inserted into the central hole 128 on the first end 120 of the ferrule 108. The shank 112 of the coupling 104 may be inserted into the central hole 128 to a point such that the threaded portion 116 of the coupling 104 contacts the first end 120 of the ferrule 108. The first end 28 of the tubular body 20 is inserted into the central hole 128 on the second end 124 of the central hole 128. In some embodiments, the tubular body 20 is inserted into the central hole 128 such that a portion of all of the plurality of layers 44-64 are within the central hole 128.

A reinforcement member in the form of a taper spring 132 includes a spring first end 136 and a spring second end 142. In some embodiments, the taper spring 132 is a metal coil spring that reduces in diameter from the spring first end 136 to the spring second end 142.

As shown in FIG. 5, during assembly of the garden hose assembly 16, the ferrule 108 is inserted onto the exterior of the tubular body 20. The reinforcement spring 132 is then coupled to the coupling 104 before insertion into the interior of the tubular body 20. The shank 112 of the coupling 104 engages the interior of the tubular body 20 and the reinforcement spring 132 is held in place within the tubular body 20. The ferrule 108 is then compressed and the plurality of layers 44-64, the coupling 104, and the reinforcement spring 132 are rigidly coupled together by the ferrule 108. In some embodiments, the compression of the ferrule 108 is temporary, and the garden hose assembly 16 may be removed from the fitting 100A, 100B as desired. In some embodiments, the compression of the ferrule 108 is permanent, such that the garden hose assembly 16 is permanently assembled. The fittings 100A, 100B is shown to engage with the first end 24 and the second end 28 of the garden hose assembly 16 having a circular shape. In other embodiments, the first and second ends 24, 28 may comprise the flattened shape of the tubular body 20 and may be configured to attach to a fitting specifically for a flattened shape. The reinforcement spring 132 is tapered and provides a smooth flow transition between flattened and circular portions of the tubular body 20, and the fittings 100A, 100B.

Both ends of the tubular body include a hose connection fitting with common garden hose threads. As a result, the flattened form is forced round at the ends as it attaches to the fittings so that the fitting encourages the normally flattened tube into a rounded profile. In some embodiments, the transition is defined by the reinforcement spring 132 or another reinforcement feature that creates a smooth transition between flat portions and round portions. Between the ends (e.g., roughly six inches from the end of the hose on both the male and female ends) the hose retains a flattened form with an internal passage that is approximately football or elliptical in shape and may even be almost rectangular with the long sides of the rectangular passage almost touching (e.g., roughly 0.75" wide by 0" to 0.125" tall). When pressurized, the internal passage expands to a round form (e.g., with an internal diameter of roughly half an inch).

In some embodiments, the tubular body 20 is formed using co-extrusion. In a first production step, the inner tube 44 and the outer tube 48 are co-extruded and cooled. Then in a second production step, the inner reinforcement 52 and the outer reinforcement 56 are wound on or otherwise applied onto the cooled inner tube 44 and outer tube 48. Immediately following the installation of the inner reinforcement 52 and the outer reinforcement 56 in the second production step, a third production step coextrudes the inner cover 60 and the outer cover 64 over the inner tube 44, the outer tube 48, the first reinforcement 52, and the outer reinforcement 56. Just after cover extrusion in the third production step and while the co-extruded covers 60, 64 are still warm (i.e., prior to full cooling), the tubular body 20 is rolled into a flattened shape in a fourth production step. In the fourth production step, the term flattened means only that the tubular body 20 is flattened relative to a circular profile or cross section. The tubular body 20 is not necessarily fully flattened such that the interior cavity is eliminated. In some embodiments, the tubular body 20 is flattened only slightly so that the cross sectional profile is generally oval. In some embodiments, the fourth production step may be eliminated so that the tubular body 20 is substantially circular in profile or cross section.

Advantageously, the layers and flattened shape of the garden hose assembly allows for a reduction in weight, more compact storage, a reduction in risk of kinking the garden hose assembly, and a greater protection against damage of the garden hose assembly. The flattened design of the garden hose assembly requires less total wall thickness to achieve the desired performance and kink resistance, so the weight of the garden hose assembly is reduced. Additionally, the garden hose assembly only includes additives in a portion of the layers. The reduction of additives further reduces the weight of the garden hose assembly. The flattened design of the garden hose assembly further allows for more compact storage of the garden hose assembly. Standard circular garden hoses require twisting while coiling to maintain clean coils and often requires storage on a hose reel. The garden hose assembly can be coiled without any twisting and will compactly coil, such that less storage space is required for the garden hose assembly.

The plurality of reinforcements within the garden hose assembly reduce the risk of kinking. The reinforcements inhibit the garden hose assembly from expanding under pressure beyond a target diameter, allowing the flattened shape to expand to a rounded shape. Additionally, the reinforcements are located between the tubes and the covers, such that the reinforcements are not damaged by any particles on the exterior of the garden hose assembly, and further cannot retain water and cause weight gain of the garden hose assembly. The combination of the flattened shape and reinforcement pattern, plus the use of the same base material (e.g., a TPE) in all layers with additives to specific layers provides a lightweight, compact, affordable garden hose that maintains its light weight when exposed to water, dirt and debris.

The relatively low durometer base thermoplastic material allows water pressure to resist kinking in use, as well as prevent permanent kinks. Plastic hoses suffer from compression set. In other words, when a plastic hose is held in a kinked state, some memory of that kink is retained and the hose is more likely to kink in the same spot again. The force on the kink, the time it is held, and the temperature at which it was held all increase the memory or permanence (i.e., the compression set) of that kink. Traditional hoses with bad memory kinks are not usable because they will remain flat at those kinked areas and restrict flow. The water pressure cannot push kinks in standard hoses back to round. The garden hose assembly 16 is much less susceptible to compression set and kinking for at least two reasons. First, the base thermoplastic material has much lower compression set than PVC, so it springs back better. Second, because it is so flexible, even if the garden hose assembly 16 has a bad memory kink or compression set, water pressure will be able to push the garden hose assembly 16 back to round, so the kink or compression set does not permanently restrict flow. Active use under pressure also works to erase the memory of the kink the longer the garden hose assembly 16 is used and held in a round arrangement.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A garden hose assembly comprising:
   an inner tube including an inner tube inner surface and an inner tube outer surface, wherein the inner tube inner surface defines an interior passageway of the garden hose assembly;
   an outer tube including an outer tube inner surface and an outer tube outer surface, wherein the outer tube inner surface surrounds the inner tube outer surface;
   a reinforcement layer including a helical pattern spiraling in at least one direction around the outer tube outer surface;
   an inner cover including an inner cover inner surface and an inner cover outer surface, wherein the inner cover inner surface surrounds the reinforcement layer; and
   an outer cover including an outer cover inner surface and an outer cover outer surface, wherein the outer cover inner surface of the outer cover surrounds the inner cover outer surface,
   wherein the inner tube comprises a base thermoplastic material and is substantially free from tubes additives, and
   wherein the base thermoplastic material of the outer tube comprises at least one additive.

2. The garden hose assembly of claim 1, defining a substantially flattened shape.

3. The garden hose assembly of claim 1, wherein the reinforcement layer allows expansion from a substantially flattened shape to a substantially circular shape in reaction to internal pressure in the interior passageway.

4. The garden hose assembly of claim 1, wherein the reinforcement layer includes a first reinforcement layer and a second reinforcement layer.

5. The garden hose assembly of claim 1, wherein the inner tube outer surface is bonded to the outer tube inner surface.

6. The garden hose assembly of claim 1, wherein the inner cover outer surface is bonded to the outer cover inner surface.

7. The garden hose assembly of claim 1, wherein the outer tube outer surface is bonded to the inner cover inner surface.

8. The garden hose assembly of claim 1, further comprising a fitting configured to attach to a first end of the garden hose assembly and including:
   a shank,
   a threaded portion,
   a spring arranged at least partially within the tubular body, and
   a ferrule surrounding the shank and structured to capture the spring.

9. The garden hose assembly of claim 8, wherein the spring is a tapered spring directly coupled to the shank and positioned at least partially within the inner tube.

10. The garden hose assembly of claim 8, wherein the shank includes a spring engaging feature shaped to engage and retain the spring in cooperation with the ferrule.

11. The garden hose assembly of claim 1, wherein a thickness of the outer tube is between about 0.010 and 0.030 inches.

12. The garden hose assembly of claim 1, wherein a thickness of the outer cover is between about 0.010 and 0.030 inches.

13. A garden hose assembly comprising:
a tubular body including:
 a tube defining an interior passageway of the garden hose assembly and comprising a base thermoplastic material, wherein the tube includes an inner tube and an outer tube,
wherein the outer tube comprises at least one tube additive to the base thermoplastic material and the inner tube is substantially free from tube additives;
a reinforcement surrounding the tube; and
a cover surrounding the reinforcement comprising the base thermoplastic material and at least one cover additive,
wherein the tubular body has a substantially flattened shape.

14. The garden hose assembly of claim 13, wherein the cover comprises an inner cover and an outer cover, wherein the outer cover comprises the cover additive to the base thermoplastic material, and
wherein the inner cover is substantially free of cover additives.

15. The garden hose assembly of claim 13, wherein the reinforcement includes a one-thousand (1000) denier twisted strand yarn.

16. The garden hose assembly of claim 13, further comprising a fitting configured to attach to a first end of the tubular body and including
a shank,
a threaded portion,
a spring arranged at least partially within the tubular body, and
a ferrule surrounding the shank and structured to capture the spring.

17. A method comprising:
co-extruding a tube including a base thermoplastic material and comprising an inner tube and an outer tube, wherein the outer tube comprises the base thermoplastic material and at least one tube additive;
applying a reinforcement to the tube;
extruding a cover over the tube and reinforcement, the cover comprising the base thermoplastic material and at least one cover additive; and
flattening the cover, reinforcement, and tube after extruding the cover and before the cover has cooled.

18. The method of claim 17, wherein flattening occurs when the cover is not fully cooled.

* * * * *